United States Patent [19]

Brown et al.

[11] 4,152,020
[45] May 1, 1979

[54] PICKUP TRUCK RACK WITH MEANS FOR FACILITATING LOADING

[76] Inventors: William D. Brown, 242 Mazanita St.; Kenneth G. Christen, 525 Herrick Ave., both of Eureka, Calif. 95501

[21] Appl. No.: 808,864

[22] Filed: Jun. 22, 1977

[51] Int. Cl.² .................. B62D 33/02; B60P 3/40
[52] U.S. Cl. ................................. 296/3; 224/273
[58] Field of Search .......... 224/42.45 R, 29 R, 42.43; 296/3, 12, 10

[56] References Cited

U.S. PATENT DOCUMENTS

| | | | |
|---|---|---|---|
| 2,720,414 | 10/1955 | Hart | 224/29 R UX |
| 3,029,101 | 4/1962 | Cook | 296/12 |
| 3,594,035 | 7/1971 | Ferguson | 296/3 |
| 3,765,713 | 10/1973 | Suitt | 296/3 |

Primary Examiner—Robert J. Spar
Assistant Examiner—Jerold M. Forsberg
Attorney, Agent, or Firm—Melvin R. Stidham

[57] ABSTRACT

A rack for a pickup truck with four corner posts supported on steel angle bed rails extending the full length of the truck box to be bolted to and protect the top and vertical walls thereof. Side rails extending between front and rear corner posts are lower than front and rear cross rails to facilitate loading, and the rear cross rail is removable to enable tall objects to be loaded on to the truck bed.

4 Claims, 7 Drawing Figures

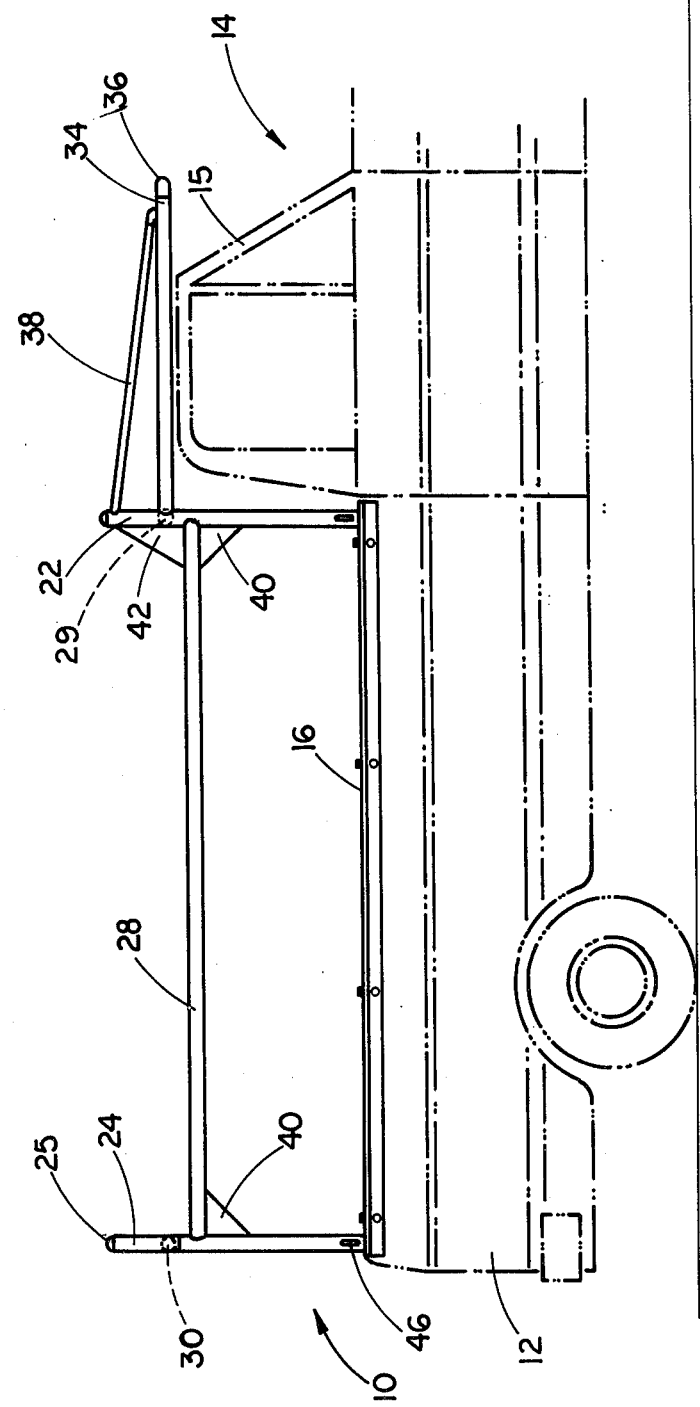

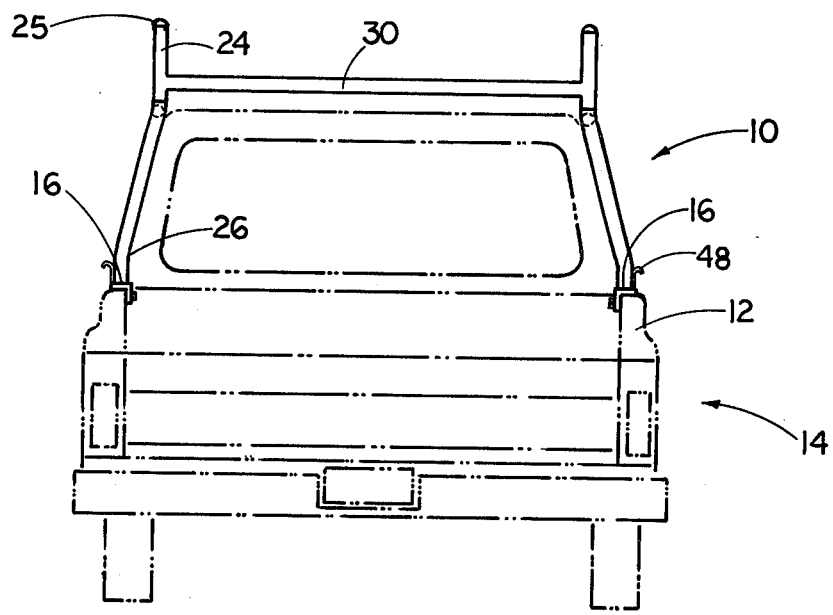
FIG.-2-
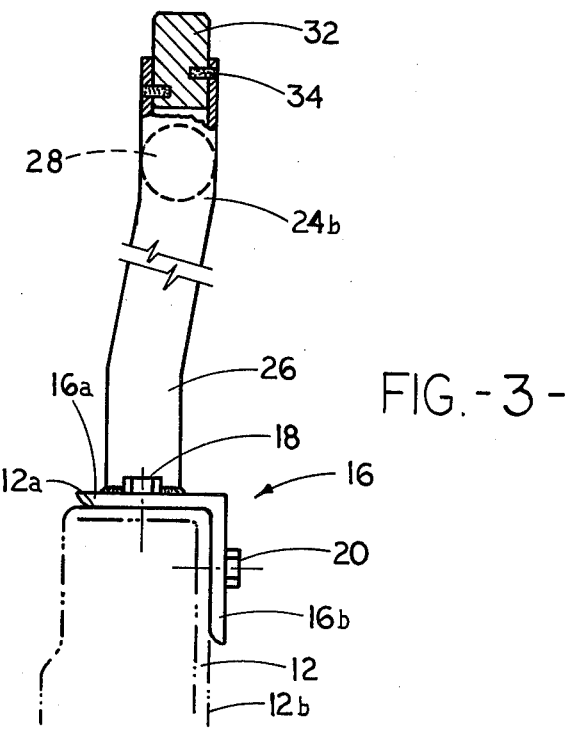
FIG.-3-

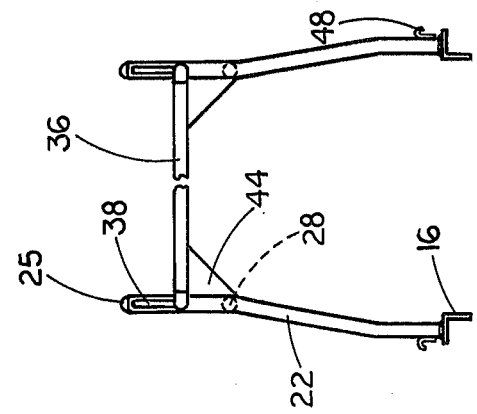
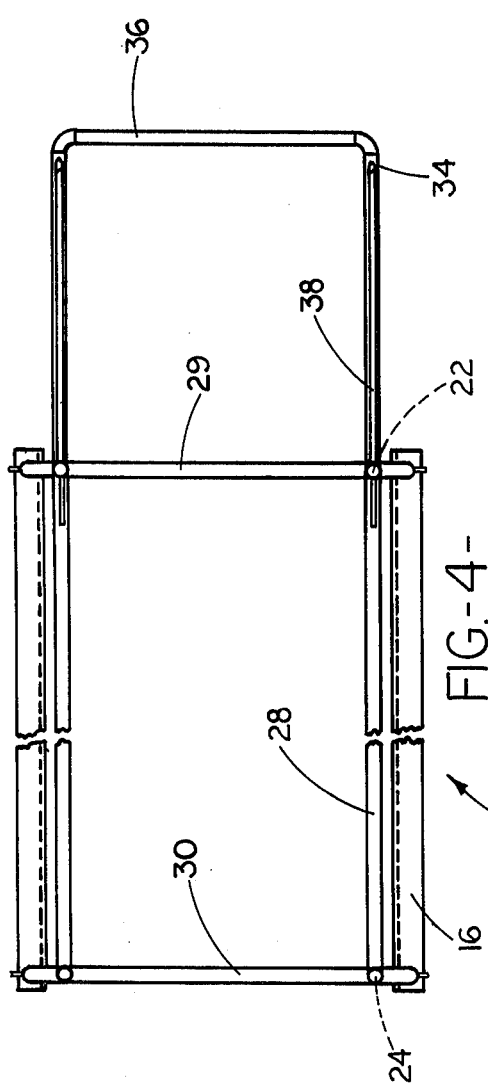
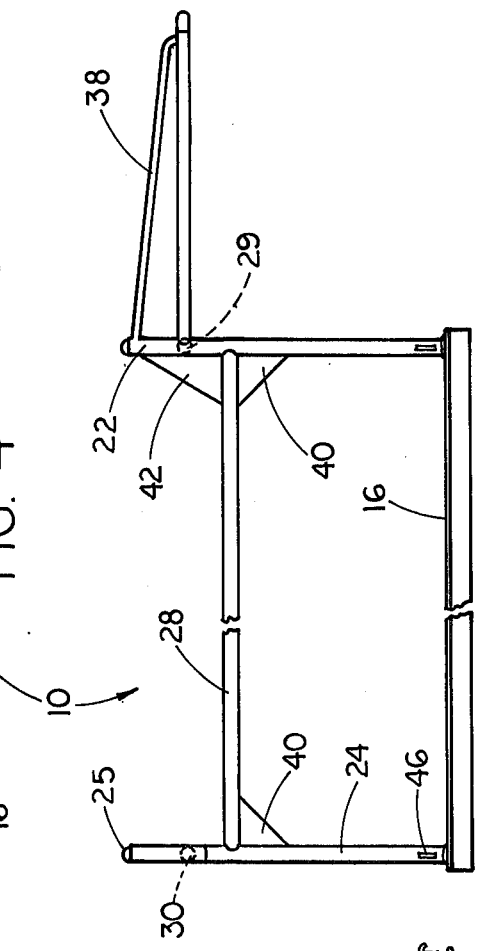
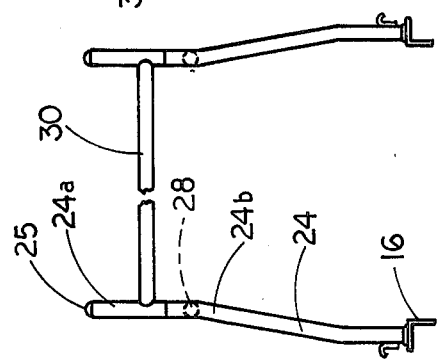

PICKUP TRUCK RACK WITH MEANS FOR FACILITATING LOADING

BACKGROUND OF THE INVENTION

To enable the loading of long pieces of equipment and materials, such as ladders, lumber, pipe sections and the like, racks have been provided with load-supporting cross bars disposed just above the level of the cab of the truck where loads may extend over the top. However, such cross rails are difficult to load with lifting equipment, such as fork lift trucks, because of the difficulty of removing the forks from under a load placed on the cross bars. In addition, such racks are in the nature of a barrier extending around and above the truck box which effectively blocks the loading of articles too tall to fit between it and the truck bed. Further, such racks generally lack lateral stability against swaying with loads under centrifugal forces, and generally being constructed of angles, often detract from the appearance of the truck.

OBJECTS OF THE INVENTION

It is an object of this invention to provide a rack for a pickup truck which readily enables loading of long materials with conventional fork lift trucks.

It is a further object of this invention to provide a rack for a pickup truck which is disposed at a level closely spaced above the cab of the truck but which enables the loading of tall loads onto the truck bed.

It is a further object of this invention to provide a rack for a pickup truck which distributes the load carried thereon evenly over the rack and over the walls of the truck box.

It is a further object of this invention to provide a pickup truck rack having exceptional lateral stability.

It is a further object of this invention to provide a rack for a pickup truck which does not detract greatly from the appearance of the truck.

Other objects and advantages of this invention will become apparent from the description to follow, particularly when read in conjunction with the accompanying drawings.

SUMMARY OF THE INVENTION

A pickup truck rack of this invention has bed rails of steel angles extending the full length of the truck box to nest against and protect the top and inner sidewalls of the truck box, wherein they may be bolted both vertically and horizontally. Forward and rear corner posts are of tubular construction interconnected by fore and aft side rails, and front and rear cross rails, all of tubular construction. The side rails are at a lower level than the cross rails whereby a load of lumber or the like may be loaded from the side, lowered onto the cross rails and the fork removed from under the load. A U-shaped forward extension is welded to the front corner post at the level of the cross rails to extend over the cab and is supported by a truss welded between the front portion thereof and the top of the front corner post. The back corner posts are in two sections telescopically connected whereby the top section may be readily removed. The rear crossbar is welded to the top sections and the fore and aft side rails are welded to the lower section whereby, removal of the top sections of the rear corner posts during loading removes the rear cross rail, leaving the rear of the truck unobstructed for loading tall articles. After loading, the rear cross rail may be replaced. Right triangular gussets having their sides welded to the side rails and corner posts increase stability both laterally and longitudinally.

BRIEF DESCRIPTION OF THE DRAWINGS

In the drawings:

FIG. 1 is a side view of the pickup truck rack of this invention as mounted in place with the truck shown in phantom;

FIG. 2 is a rear view of the rack;

FIG. 3 is an enlarged view, partially broken away, of a rear corner post; and

FIGS. 4, 5, 6 and 7 are top, side, front and rear views, respectively, of the rack.

DESCRIPTION OF A PREFERRED EMBODIMENT

Referring now to FIG. 1 with greater particularity, the rack 10 of this invention is shown mounted on the box 12 of a pickup truck 14, which is illustrated in phantom. The rack 10 includes a pair of bed rails 16 which are made of steel angles with horizontal and vertical legs 16a and 16b (FIG. 3). The bed rails 16 extend the full length of the truck box 12, whereby they nest firmly on the top of the truck box to protect the top and side surfaces 12a and 12b when the vehicle is loaded from the side. In addition, the rails 16 distribute loads along the truck box 12, and legs of the angle 16a and 16b may be secured to both the horizontal and vertical panels 12a and 12b by means of bolts 18 and 20, respectively to provide a firm anchor and lateral support, for exceptional stability.

Secured to ends of the bed rails are front and rear corner posts 22 and 24 which are bent inward at 26 (FIG. 2) for greater lateral stability against centrifugal forces and other lateral forces asserted on an overhead load. The corner posts 22 and 24 are preferably of tubular configuration and may be topped with hemispherical caps 25 for aesthetic effect. Welded between front and rear posts 22 and 24 are fore and aft side rails 28 and welded between the front corner posts 22 and the rear corner posts 24 are, respectively, front and rear cross rails 29 and 30 all of tubular configuration. It will be noted that the side rails 28 are disposed at a slightly lower elevation, say 3 to 4 inches, than the cross rails 29 and 30, whereby a load of material, such as long boards may be loaded from the side of the vehicles by conventional fork lift truck (not shown), and when the load is settled down onto the cross rails 29 and 30, the fork may be lowered to be retracted from beneath the load so placed. Because the cross rails 29 and 30 are adapted to support loads under beam loading, they may be made of larger cross sections than the corner posts 22 and 24.

Referring now to FIG. 3, the rear corner posts 24 are formed in two sections 24a and 24b which are telescopically joined. The joint may include a solid round bar 32 of a diameter to fit snugly into the lower section 24b and welded at 34 through holes drilled into the core 32 through the walls of the section 24b. The rear cross rail 30 is welded to the upper section 24a and the side rails 28 is welded to the lower section 24b, whereby when loading tall objects, such as a refrigerator, certain machinery and the like, the upper section 24a may be lifted off of the lower section carrying with it the rear cross rail 30, and leaving the rear of the truck unobstructed for loading. While so loading, the top section 24a with cross member 30 may be simply placed aside or may be received over one of the lower sections 24b and pivoted out of the way to the side of the truck.

Extending forwardly from the front corner post 22 is a horizontal U-shaped forward extension 34 which, when the rack 10 is mounted, extends over the cab 15 of the truck 14, providing a forward cross rail 36 for further support of long loads. A gusset bar 38 extending from the forward portion of the front extension 34 is welded to the top of the front corner post 22 to unify the structure and provide greater stability transferring the weight back to the corner post 22.

Bottom right triangular gusset plates 40 have their side edges welded to the corner posts 22 and 24, and to the bottom of the side rails 28, and top right triangular gusset plates 42 are welded along their side edges to the top of the side rail and the forward corner post 22. In addition (FIG. 6) lateral gusset plates 44 are welded at their side edges to the front corner posts and the bottom of the front cross rail 29. Thus, the gusset plates provide stability in both directions, laterally and fore and aft, providing a unitized structure which is extremely stable and which functions also as a roll bar to protect against injuries.

With all of the frame, above the bed rails fabricated from tubular bars configuration, the relatively attractive rack 10, besides being utilitarian blends nicely with the design lines of the truck 12 and does not appear bulky or unwieldy. As a further utilitarian feature, hook members 36 may be welded to the sides of the corner post to facilitate tying ropes for securing loads in place.

While this invention has been described in conjunction with preferred embodiment thereof, it is obvious that modifications and changes therein may be made by those skilled in the art without departing from the spirit and scope of this invention.

What is claimed as invention is:

1. A rack for a pickup truck comprising:
    a pair of angle bed rails adapted to be secured to and along the sides of a truck box nested over the top and a vertical wall thereof:
    a pair of front, and a pair of rear, upright corner posts supported on said bed rails;
    front and rear load-supporting cross rails rigidly secured between said front and said rear corner posts, respectively near the tops thereof; and
    side rails rigidly secured between each rear corner post and a front corner post;
    said side rails being at a lower elevation than said cross-rails to enable movement of the tines of a fork lift device laterally of said side rails under a load supported jointly by said load-supporting cross rails;
    said rear corner posts being of cylindrical tubular construction and each including top and bottom sections telescopically joined, each pair of said joined top and bottom sections being relatively rotatable when the other pair thereof is separated;
    said rear cross rail being secured between said top sections and said side rails being secured to said bottom sections to enable removal of said rear cross rail by separation of said top sections to facilitate loading from the rear.

2. The rack defined by claim 1 including:
    bottom right triangular gusset plates welded along their sides to said corner posts and the bottom of said side rails; and
    top right triangular gusset plates welded along their sides to said front corner posts and the tops of said side rails.

3. A rack for a pickup truck comprising:
    a pair of angle bed rails adapted to be secured to and along the sides of a truck box nested over the top and a vertical wall thereof:
    a pair of front, and a pair of rear, upright corner posts supported on said bed rails;
    front and rear load-supporting cross rails rigidly secured between said front and said rear corner posts, respectively near the tops thereof; and
    side rails rigidly secured between each rear corner post and a front corner post, said side rails being at a lower elevation then said cross-rails to enable movement of the tines of a fork lift device laterally of said side rails under a load supported jointly by said load-supporting cross-rails;
    said rear corner posts being of cylindrical tubular construction, each including top and bottom sections telescopically joined;
    said rear cross rail being secured between said top sections and said side rails being secured to said bottom sections to enable removal of said rear cross rail by separation of said top sections to facilitate loading from the rear, each pair of said sections when telescopically joined being relatively rotatable when the other pair of said sections is separated.

4. The rack defined by claim 3 including:
    bottom right triangular gusset plates welded along their sides to said corner posts and the bottom of said side rails; and
    top right triangular gusset plates welded along their sides to said front corner posts and the tops of said side rails.

* * * * *